United States Patent
Levin (10) Patent No.: US 10,621,198 B1
(45) Date of Patent: Apr. 14, 2020

(54) SYSTEM AND METHOD FOR SECURE DATABASE REPLICATION

(71) Applicant: Palantir Technologies Inc., Palo Alto, CA (US)

(72) Inventor: Michael Levin, Palo Alto, CA (US)

(73) Assignee: Palantir Technologies Inc., Palo Alto, CA (US)

(*) Notice: Subject to any disclaimer, the term of this patent is extended or adjusted under 35 U.S.C. 154(b) by 352 days.

(21) Appl. No.: 15/394,498

(22) Filed: Dec. 29, 2016

Related U.S. Application Data (60) Provisional application No. 62/273,351, filed on Dec. 30, 2015.

(51) Int. Cl.
*G06F 16/27* (2019.01)
*G06F 21/62* (2013.01)
(Continued)

(52) U.S. Cl.
CPC .............. *G06F 16/27* (2019.01); *G06F 21/44* (2013.01); *G06F 21/60* (2013.01); *G06F 21/62* (2013.01); *G06F 21/6218* (2013.01); *G06F 21/6227* (2013.01); *G06F 21/6236* (2013.01); *G06F 21/6245* (2013.01); *G06F 2221/2129* (2013.01); *G06F 2221/2141* (2013.01)

(58) Field of Classification Search
CPC ...... G06F 16/122; G06F 16/27; G06F 16/273; G06F 16/275; G06F 17/30082; G06F 17/30283; G06F 17/30578; G06F 17/30581; G06F 21/62; G06F 21/6209; G06F 21/6218; G06F 21/6236; G06F 21/6245;
(Continued)

(56) References Cited

U.S. PATENT DOCUMENTS

| 5,548,749 A | 8/1996 | Kroenke et al. |
| 5,708,828 A | 1/1998 | Coleman |

(Continued)

FOREIGN PATENT DOCUMENTS

| AU | 2011279270 | 9/2015 |
| EP | 0 816 968 | 1/1996 |

(Continued)

OTHER PUBLICATIONS

OWL Web Ontology Language Reference Feb. 4, W3C, http://www.w3.org/TR/owl-ref/.

(Continued)

*Primary Examiner* — David T. Brooks
(74) *Attorney, Agent, or Firm* — Hickman Palermo Becker Bingham LLP (57) ABSTRACT

Systems and methods for securely replicating a database include receiving, at a server with access to a database comprising a plurality of database entries, a request to replicate the database to a computing device, wherein access to each database entry of the plurality of database entries is controlled based on a plurality of classification levels; determining, by the server, a classification level of the computing device; filtering, by the server, the plurality of database entries to generate a filtered subset of the plurality of database entries, wherein the filtered subset comprises database entries at or below the classification level of the computing device; sending, to the computing device, the filtered subset, wherein the computing device uses the filtered subset to create a replicated database.

20 Claims, 5 Drawing Sheets

(51) Int. Cl.
*G06F 21/44* (2013.01)
*G06F 21/60* (2013.01)

(58) Field of Classification Search
CPC ..... G06F 2221/2141; G06F 2221/2145; G06F 2221/2149; G06F 17/30; G06F 21/00; G06F 21/30; G06F 21/44; G06F 21/45; G06F 21/57; G06F 21/60; G06F 21/602; G06F 21/604; G06F 21/65; G06F 21/6227; G06F 2221/2129; G06F 2221/2113; G06F 2221/214; H04L 63/105
See application file for complete search history.

(56) References Cited

U.S. PATENT DOCUMENTS

| | | | |
|---|---|---|---|
| 5,765,171 A | 6/1998 | Gehani et al. | |
| 5,870,761 A | 2/1999 | Demers et al. | |
| 6,098,078 A | 8/2000 | Gehani et al. | |
| 6,108,787 A * | 8/2000 | Anderson | G06F 21/606 |
| | | | 709/249 |
| 6,190,053 B1 | 2/2001 | Stahlecker et al. | |
| 6,202,085 B1 | 3/2001 | Benson et al. | |
| 6,216,140 B1 | 4/2001 | Kramer | |
| 6,240,414 B1 | 5/2001 | Beizer et al. | |
| 6,317,754 B1 | 11/2001 | Peng | |
| 6,374,252 B1 | 4/2002 | Althoff et al. | |
| 6,539,381 B1 | 3/2003 | Prasad et al. | |
| 6,560,620 B1 | 5/2003 | Ching | |
| 6,816,941 B1 | 11/2004 | Carlson et al. | |
| 7,072,911 B1 | 7/2006 | Doman | |
| 7,167,877 B2 | 1/2007 | Balogh et al. | |
| 7,437,664 B2 | 10/2008 | Borson | |
| 7,596,285 B2 | 9/2009 | Brown et al. | |
| 7,676,788 B1 | 3/2010 | Ousterhout et al. | |
| 7,730,396 B2 | 6/2010 | Chidlovskii et al. | |
| 7,818,297 B2 | 10/2010 | Peleg et al. | |
| 7,877,421 B2 | 1/2011 | Berger et al. | |
| 7,962,495 B2 | 6/2011 | Jain et al. | |
| 8,015,151 B2 | 9/2011 | Lier et al. | |
| 8,290,990 B2 | 10/2012 | Drath et al. | |
| 8,301,904 B1 | 10/2012 | Gryaznov | |
| 8,312,546 B2 | 11/2012 | Alme | |
| 8,316,060 B1 | 11/2012 | Snyder et al. | |
| 8,380,659 B2 | 2/2013 | Zunger | |
| 8,442,940 B1 | 5/2013 | Faletti et al. | |
| 8,515,912 B2 | 8/2013 | Garrod et al. | |
| 8,527,461 B2 | 9/2013 | Ducott, III et al. | |
| 8,646,080 B2 | 2/2014 | Williamson et al. | |
| 8,688,749 B1 | 4/2014 | Ducott, III et al. | |
| 8,726,379 B1 | 5/2014 | Stiansen et al. | |
| 8,782,004 B2 | 7/2014 | Ducott, III et al. | |
| 8,838,538 B1 | 9/2014 | Landau et al. | |
| 8,886,601 B1 | 11/2014 | Landau et al. | |
| 9,009,827 B1 | 4/2015 | Albertson et al. | |
| 9,275,069 B1 | 3/2016 | Garrod et al. | |
| 9,330,157 B2 | 5/2016 | Ducott, III et al. | |
| 10,152,384 B1 * | 12/2018 | Amit | G06F 16/27 |
| 2002/0073072 A1 * | 6/2002 | Fukumoto | G06F 21/6218 |
| 2003/0084017 A1 | 5/2003 | Ordille | |
| 2003/0088654 A1 | 5/2003 | Good et al. | |
| 2003/0182313 A1 | 9/2003 | Federwisch et al. | |
| 2003/0196108 A1 * | 10/2003 | Kung | H04L 63/0823 |
| | | | 726/6 |
| 2004/0103124 A1 | 5/2004 | Kupkova | |
| 2004/0111390 A1 | 6/2004 | Saito et al. | |
| 2004/0250576 A1 | 12/2004 | Flanders | |
| 2005/0034107 A1 | 2/2005 | Kendall et al. | |
| 2005/0108063 A1 | 5/2005 | Madill et al. | |
| 2005/0193024 A1 | 9/2005 | Beyer et al. | |
| 2006/0036568 A1 | 2/2006 | Moore et al. | |
| 2006/0059567 A1 * | 3/2006 | Bird | G06F 12/1466 |
| | | | 726/27 |
| 2006/0080316 A1 * | 4/2006 | Gilmore | G06F 21/6209 |
| 2006/0085837 A1 * | 4/2006 | Pesati | G06F 21/6227 |
| | | | 726/1 |
| 2006/0106879 A1 | 5/2006 | Zondervan et al. | |
| 2006/0155945 A1 | 7/2006 | McGarvey | |
| 2006/0190497 A1 | 8/2006 | Inturi et al. | |
| 2006/0206485 A1 * | 9/2006 | Rubin | G06F 21/6227 |
| 2006/0206866 A1 | 9/2006 | Eldrige et al. | |
| 2006/0218637 A1 | 9/2006 | Thomas et al. | |
| 2006/0224579 A1 | 10/2006 | Zheng | |
| 2007/0005707 A1 | 1/2007 | Teodosiu et al. | |
| 2007/0026373 A1 | 2/2007 | Suriyanarayanan et al. | |
| 2007/0112887 A1 | 5/2007 | Liu et al. | |
| 2007/0168516 A1 | 7/2007 | Liu et al. | |
| 2007/0180075 A1 | 8/2007 | Chasman et al. | |
| 2007/0220067 A1 | 9/2007 | Suriyanarayanan et al. | |
| 2007/0220328 A1 | 9/2007 | Liu et al. | |
| 2007/0233756 A1 | 10/2007 | D'Souza et al. | |
| 2007/0299887 A1 | 12/2007 | Novik et al. | |
| 2008/0010233 A1 * | 1/2008 | Sack | G06F 21/6227 |
| 2008/0027981 A1 | 1/2008 | Wahl | |
| 2008/0033753 A1 | 2/2008 | Canda et al. | |
| 2008/0086718 A1 | 4/2008 | Bostick et al. | |
| 2008/0091747 A1 * | 4/2008 | Prahlad | G06F 21/6218 |
| 2008/0141117 A1 | 6/2008 | King et al. | |
| 2008/0148398 A1 | 6/2008 | Mezack et al. | |
| 2008/0189240 A1 | 8/2008 | Mullins et al. | |
| 2008/0235575 A1 | 9/2008 | Weiss | |
| 2008/0243951 A1 | 10/2008 | Webman et al. | |
| 2008/0320299 A1 | 12/2008 | Wobber et al. | |
| 2009/0172821 A1 | 7/2009 | Daira et al. | |
| 2009/0199090 A1 | 8/2009 | Poston et al. | |
| 2009/0254970 A1 | 10/2009 | Agarwal et al. | |
| 2009/0319529 A1 * | 12/2009 | Bartlett | G06F 21/6209 |
| 2010/0100963 A1 | 4/2010 | Mahaffey | |
| 2010/0145909 A1 | 6/2010 | Ngo | |
| 2010/0180337 A1 * | 7/2010 | Bajekal | G06F 21/6227 |
| | | | 726/19 |
| 2010/0330801 A1 | 12/2010 | Rouh | |
| 2011/0010342 A1 | 1/2011 | Chen et al. | |
| 2011/0219450 A1 | 9/2011 | McDougal et al. | |
| 2011/0246229 A1 | 10/2011 | Pacha | |
| 2012/0005159 A1 | 1/2012 | Wang et al. | |
| 2012/0016849 A1 | 1/2012 | Garrod et al. | |
| 2012/0023075 A1 | 1/2012 | Pulfer et al. | |
| 2012/0036106 A1 | 2/2012 | Desai et al. | |
| 2012/0254129 A1 | 10/2012 | Wheeler et al. | |
| 2013/0006655 A1 | 1/2013 | Van Arkel et al. | |
| 2013/0006668 A1 | 1/2013 | Van Arkel et al. | |
| 2013/0067017 A1 | 3/2013 | Carriere et al. | |
| 2013/0173540 A1 | 7/2013 | Qian et al. | |
| 2013/0191336 A1 * | 7/2013 | Ducott, III | G06F 21/6218 |
| | | | 707/634 |
| 2013/0191338 A1 | 7/2013 | Ducott, III et al. | |
| 2013/0276799 A1 | 10/2013 | Davidson | |
| 2013/0346444 A1 | 12/2013 | Makkar et al. | |
| 2014/0011000 A1 | 1/2014 | Dunkmann et al. | |
| 2014/0040182 A1 | 2/2014 | Gilder et al. | |
| 2014/0040714 A1 | 2/2014 | Siegel et al. | |
| 2014/0081652 A1 | 3/2014 | Klindworth | |
| 2014/0114972 A1 | 4/2014 | Ducott et al. | |
| 2014/0129518 A1 | 5/2014 | Ducott et al. | |
| 2014/0137265 A1 * | 5/2014 | Dubman | G06F 21/6227 |
| | | | 726/27 |
| 2014/0149130 A1 | 5/2014 | Getchius | |
| 2015/0074050 A1 | 3/2015 | Landau et al. | |
| 2015/0235334 A1 | 8/2015 | Wang et al. | |
| 2015/0261847 A1 | 9/2015 | Ducott et al. | |
| 2016/0019252 A1 | 1/2016 | Ducott et al. | |
| 2016/0335338 A1 * | 11/2016 | Beiter | G06F 16/184 |

FOREIGN PATENT DOCUMENTS

| | | |
|---|---|---|
| EP | 1647908 | 4/2006 |
| EP | 2911078 | 8/2015 |
| NL | 2011642 | 8/2015 |

(56) References Cited

FOREIGN PATENT DOCUMENTS

| WO | WO 2008/113059 | 9/2008 |
| WO | WO 2011/161565 | 12/2011 |
| WO | WO 2012/009397 | 1/2012 |

OTHER PUBLICATIONS

Parker, Jr. et al., "Detection of Mutual Inconsistency in Distributed Systems," IEEE Transactions in Software Engineering, May 1983, vol. SE-9, No. 3, pp. 241-247.
Mattern, F., "Virtual Time and Global States of Distributed Systems," Cosnard, M., Proc. Workshop on Parallel and Distributed Algorithms, Chateau de Bonas, France: Elsevier, 1989, pp. 215-226.
Loeliger, Jon, "Version Control with Git," O'Reilly, May 2009, pp. 330.
Lamport, "Time, Clocks and the Ordering of Events in a Distributed System," Communications of the ACM, Jul. 1978, vol. 21, No. 7, pp. 558-565.
Holliday, JoAnne, "Replicated Database Recovery using Multicast Communication," IEEE 2002, pp. 11.
Dell Latitude D600 2003, Dell Inc., http://www.dell.com/downloads/global/products/latit/en/spec_latit_d600_en.pdf.
Fidge, Colin J., "Timestamps in Message-Passing Systems," K. Raymond (Ed.) Proc. of the 11th Australian Computer Science Conference (ACSC 1988), pp. 56-66.
O'Sullivan, Bryan, "Making Sense of Revision Control Systems," Communications of the ACM, Sep. 2009, vol. 52, No. 9, pp. 57-62.
Symantec Corporation, "E-Security Begins with Sound Security Policies," Announcement Symantec, Jun. 14, 2001.
Dou et al., "Ontology Translaation on the Semantic Web 2005," Springer-Verlag, Journal on Data Semantics II Lecture Notes in Computer Science, vol. 3350, pp. 35-37.

\* cited by examiner

SYSTEM AND METHOD FOR SECURE DATABASE REPLICATION

BENEFIT CLAIM

This application claims the benefit under 35 U.S.C. § 119(e) of provisional application 62/273,351, filed Dec. 30, 2015, the entire contents of which are hereby incorporated by reference for all purposes as if fully set forth herein.

TECHNICAL FIELD

Some embodiments of the present invention relate generally to improved systems, methods, and computer readable mediums for increasing the security of replicated databases.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computers are powerful tools for accessing and storing vast amounts of information. Computer databases are a common mechanism for storing information on computer systems. Databases can take many different forms. One typical database is a collection of tables having rows and columns of information. For example, a database table of employees may have a row for each employee, and the columns designating specifics about the employee, such as the employee's name, address, salary, etc.

There are many different types of databases and database systems. In many instances, a database may be accessed by many users simultaneously. The database may be accessed using any suitable connection, such as the Internet. In the event that a user lacks a connection to the database, that user would then not be able to access the information in the database. In some situations, a constant connection to a centralized or main database is not possible. In those situations, a replicated database system is a potential solution.

Replicated database systems provide many advantages. In particular, in an environment where a stable connection to the main database does not exist, replicating the main database ensures that work can continue even when no connection is available. However, even with state of the art security controls, replicated systems present a fundamental security risk simply because there are multiple copies of data in existence, and the physical security of each copy cannot be guaranteed. Improved security methods for replicated databases are needed.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for improving security in replicated databases. Specifically, a server with access to a database receives a request from a computing device to replicate the database. The database contains many different database entries associated with varying classification levels. The computing device may make the request, for example, because the computing device does not, or will not, have a reliable connection to the server in the future. The server determines a classification level of the computing device. The classification level of the computing device may be associated with a device identification number or other ways of identifying the computing device. Once the classification level of the computing device is determined, a filtered subset of the database entries is generated, the filtered subset contains database entries at or below the classification level associated with the computing device. The filtered subset is sent to the computing device, and the computing device may use the filtered subset to create a replicated database. Once created, the replicated database may be accessed and or perform any actions as though the replicated database were the "original" or main database. For example, a second computing device may connect to the computing device hosting the replicated database, access the database, and/or replicate the replicated database. In other words, the computing device may act as a server. Many other aspects and uses of this technology are discussed below.

Example System Implementation

Figure 1:
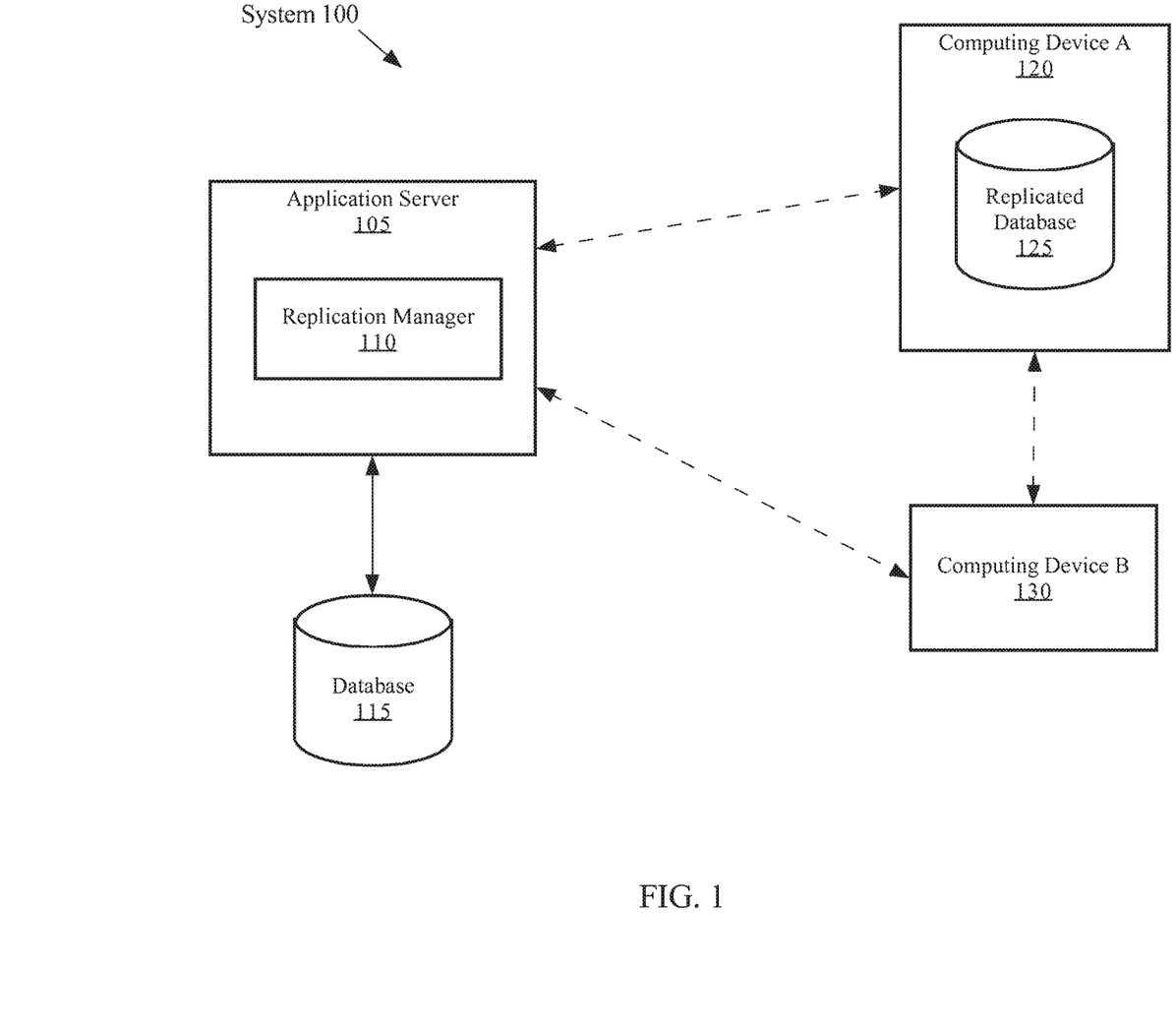
FIG. 1 shows a block diagram of a system in accordance with an embodiment of the invention.

FIG. 1 illustrates an example computer system 100 in which the techniques described may be practiced, according to some embodiments. System 100 is a computer-based system. The various components of system 100 are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. System 100 illustrates only one of many possible arrangements of components configured to execute the programming described herein. Other arrangements may include fewer or different components, and the division of work between the components may vary depending on the arrangement.

System 100 includes application server 105, replication manager 110, database 115, computing device A 120, replicated database 125, and computing device B 130. Application server 105 may be any kind of computing device including, but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, minicomputers, and the like. Application server 105 is communicatively connected, using wired and/or wireless connections, to database 115, client device A 120, and client device B 130. Although a single application server 105 is shown in FIG. 1, any number of application servers 105 may be used. Additionally, one or more load balancers (not shown) may be used when there are multiple application servers in use. In one embodiment, application server 105 may execute any number of software applications, such as replication manager 110.

In one embodiment, database 115 is any suitable storage device such as one or more hard disk drives, memories, or any other electronic digital data recording device configured to store data. Although database 115 is depicted as a single device in FIG. 1, database 115 may span multiple devices located in one or more physical locations. Additionally, in one embodiment, database 115 may be located on the same device(s) as application server 105. Alternatively, database 115 may be located on a separate device(s) from application server 105, or any other suitable component. Database 115 may store any type of information in any format. Database 115 is managed by a database management system (not shown). The database management system may be implemented by any one of a variety of different database management systems and embodiments of the invention are not limited to any particular database management system. For example, the database management system may be implemented by a conventional relational database management system (RDBMS). Alternatively, as another example, the database management system may be implemented using a "NoSQL" database management system or other database management system that differs from a traditional RDBMS in one or more respects.

In one embodiment, database 115 organizes data in a structure that is described using an ontology, embodied in a database schema, comprising a data model that is used to represent the structure and reason about objects in the structure. The ontology may define one or more object types, and each object type may have one or more properties. Specifically, database 115 contains database entries. The database entries may be files, objects, or other data. Further, the database entries may be specific fields, data, or elements within the files, objects, or other data.

In one embodiment, the information stored in database 115 may be access controlled. Specifically, database 115 may store data that is associated with varying classification schemes that limit access to data to approved users. The classification system used may be any system. In one embodiment, both a group based and a classification based system may be used. A group based system involves assigning users, computing devices, and/or data to various groups. For example, if database 115 is a database for sharing graphs, investigations, and other work within an international community, the groups may be country based, region or location based (i.e., where the user is logging in from and/or where a computing device is located), team based, based on any other grouping, or based on various combinations of any of the above. A classification based system may have varying levels of secrecy, such as top secret, secret, classified, and unclassified, or any other levels of secrecy. The classification may be inferred from the group memberships associated with a user or computing device. The classification may be inferred in any suitable manner, using, for example, a mapping set by an administrator or other user. Classification and/or group membership may be automatically be assigned to data within database 115 based on the classification and/or group membership of the user and/or computing device that created the database entry, or any other method. Specifically, individual users need not manually set the group membership and/or classification level of data. Rather, the system 100 determines the group membership and/or classification level of data within database 115.

In one embodiment, database 115 enables users of varying classification levels to share a single instance, rather than having to divide the database or database entries into different workspaces or instances. Thus, a user with top secret classification may edit the same database entry as a user with secret classification on the same workspace or instance. This enables a streamlined approach to sharing information and data within the database. Further, the users of database 115 do not need to manually set the classification level of each individual database entry or piece of information. Rather, the classification levels of individual database entries or pieces of information may be inferred from group memberships associated with the user creating or editing the information, as well as other contextual information. Alternatively, or in addition to classification levels, group memberships may be used.

Returning to application server 105, in one embodiment application server 105 executes replication manager 110. Replication manager 110 includes programming to access database 115, receive requests, determine classification levels of computing devices, filter database 115, send filtered data to computing devices, and sync modifications to database 115. Replication manager 110 may access database 115 in any suitable manner, such as using a database connector. Specifically, replication manager 110 accesses database 115 to filter the data in database 115 for use in creating a replicated database, as discussed below.

In one embodiment, replication manager 110 includes programming to receive requests to replicate database 115. The requests may be received in any format, and at any time. The requests may include additional information, such as an identification of the device that is requesting replication of database 115, a current location of the device that is requesting replication, a username identifying an individual associated with the request, or any other information.

In one embodiment, replication manager 110 includes programming to determine the classification levels of computing devices. Replication manager 110 determines the classification levels of a computing device based on an identification of the computing device. At an initial setup of a computing device, group identifications may be assigned to the computing device, and a mapping of computing devices to group identifications may be stored in database 115 or other suitable location accessible by replication manger 110. Replication manager 110 may use the group identifications to infer the classification level of the computing device. For example, if a laptop is assigned the grouping: country—United States, team—intelligence, location—Iraq, then the inferred classification may be for any information classified as secret or below.

Optionally, replication manager 110 may determine whether the replicated database requested for the computing device is intended to be used by multiple users, or a single user. If the computing device is intended to be used by multiple users, no database filtering may occur. This is to ensure that the correct files are available to all potential users of the computing device. However, if the expected users of the computing device are known, then the database may be filtered consistent with the highest classification level among the expected users. In one embodiment, replication manager 110 checks a current location of the requesting computing device against an expected location, and may adjust the classification level of the computing device accordingly. For example, if a computing device is supposed to be located in the United States, but is instead currently located in South America, the classification level of the computing device may be lowered.

In one embodiment, replication manager 110 includes programming to filter the database entries within database 115 to generate a filtered subset of database 115. The data may be filtered in any suitable manner. Specifically, the data is filtered based on the classification level associated with the requesting computing device. The filtering removes any information or data above the classification level associated with the requesting device. Specifically, the filtering may remove entire database entries, or may remove portions of database entries. For example, if a database entry is a medical form, the filtering process may remove the entire form from the resulting filtered subset. Thus, a user of the replicated database created from the filtered subset would never know that the medical form was missing, as the database entry does not exist in the replicated database. Alternatively, as another example, the filtering process may remove fields within the medical form, such as a social security number. Thus, a user of the replicated database may be able to view the medical form, but would be unable to view the social security number, which may be redacted, blank, or removed in any other suitable manner.

In one embodiment, replication manager 110 includes programming to send the filtered data to a computing device. The filtered data may be sent to the requesting computing device in any manner. Optionally, additional information may be sent in addition to the filtered data. For example, a username/password list, or other access list, may be sent so that individual users may login to the replicated database the same way the users would when accessing the main database.

In one embodiment, replication manager 110 includes programming to sync modifications made to either database 115 and/or a replicated database. Modifications may be synced in any suitable manner. Specifically, if data visible to the replicated database was updated on the main database, the updates may be pushed down to the replicated database. For example, if a replicated database contains database entries of a "classified" level or below, and a new "classified" database entry was added to the main database, that database entry is sent to the computing device associated with the replicated database as part of the synchronization process. Alternatively, or in addition, if changes were made to the replicated database, those changes may be sent to the main database and incorporated according to any rules or procedures.

In one embodiment, computing device A 120 and/or computing device B 130 may be any kind of computing devices including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Although two computing devices (i.e., computing device A 120 and computing device B 130) are shown in FIG. 1, any number of computing devices may be present. Both computing device A 120 and/or computing device B 130 may be associated with one or more groups and/or classification levels, which determine what database entries or other data may be replicated to computing device A 120 and/or computing device B 130.

Computing device A 120 is communicatively connected to application server 105 and computing device B 130. Computing device B 130 is communicatively connected to application server 105 and computing device A 120. The connection between the computing devices and any other component of system 100 may not be constant, and may be unreliable. In other words, at times computing device A 120 and/or computing device B 130 may be unable to communicate with application server 105, for example. Computing device A 120 and/or computing device B 130 may execute one or more software applications (not shown). The software applications may be general purpose applications, such as a web browser, spreadsheet application, or a customized application, such as an application for retrieving and analyzing data from a database. The software applications may be thin client or thick client. The software applications may send requests to application server 105 in any manner and/or in any format now known or later developed.

In one embodiment, computing device A 120 includes replicated database 125. Replicated database 125 is a replicated version of database 115, and may be located on any suitable storage device such as one or more hard disk drives, memories, or any other electronic digital data recording device configured to store data. As a security measure, replicated database 125 may include less data than database 115, depending on a classification level of computing device A 120. Computing device A 120 may include functionality to operate replicated database 125 as though computing device A 120 were a server. In other words, other devices (i.e., computing device B 130) may connect to computing device A 120 to access, modify, or otherwise interact with replicated database 125 using the same username, password, or other credentials as would be used to access, modify, or otherwise interact with database 115. Alternatively, or in addition, different users may login to access replicated database 125 via computing device A 120.

In one embodiment, computing device A 120 may execute a replication manager (not shown) or other similar software to provide any of the functionality associated with replication manager 110. For example, once computing device A 120 has replicated database 125, a second computing device, such as computing device B 130, may request to replicate a database from replicated database 125. The subsequently replicated database may have even fewer database entries than replicated database 125 if, for example, the classification level of computing device B 130 is lower than that of computing device A 120.

Example Functional Implementation

Figure 2A:
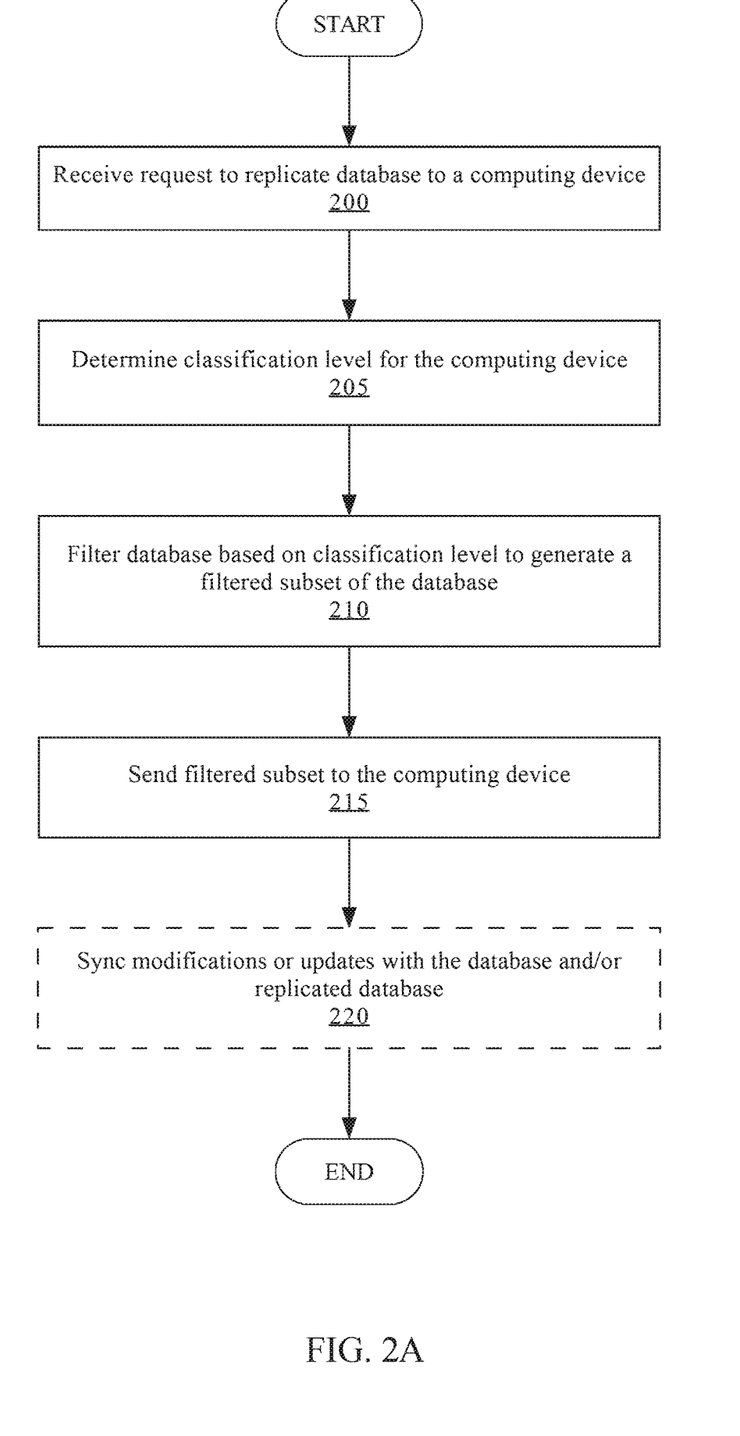
FIG. 2A and FIG. 2B show flowcharts of a method in accordance with an embodiment of the invention.
Figure 2B:
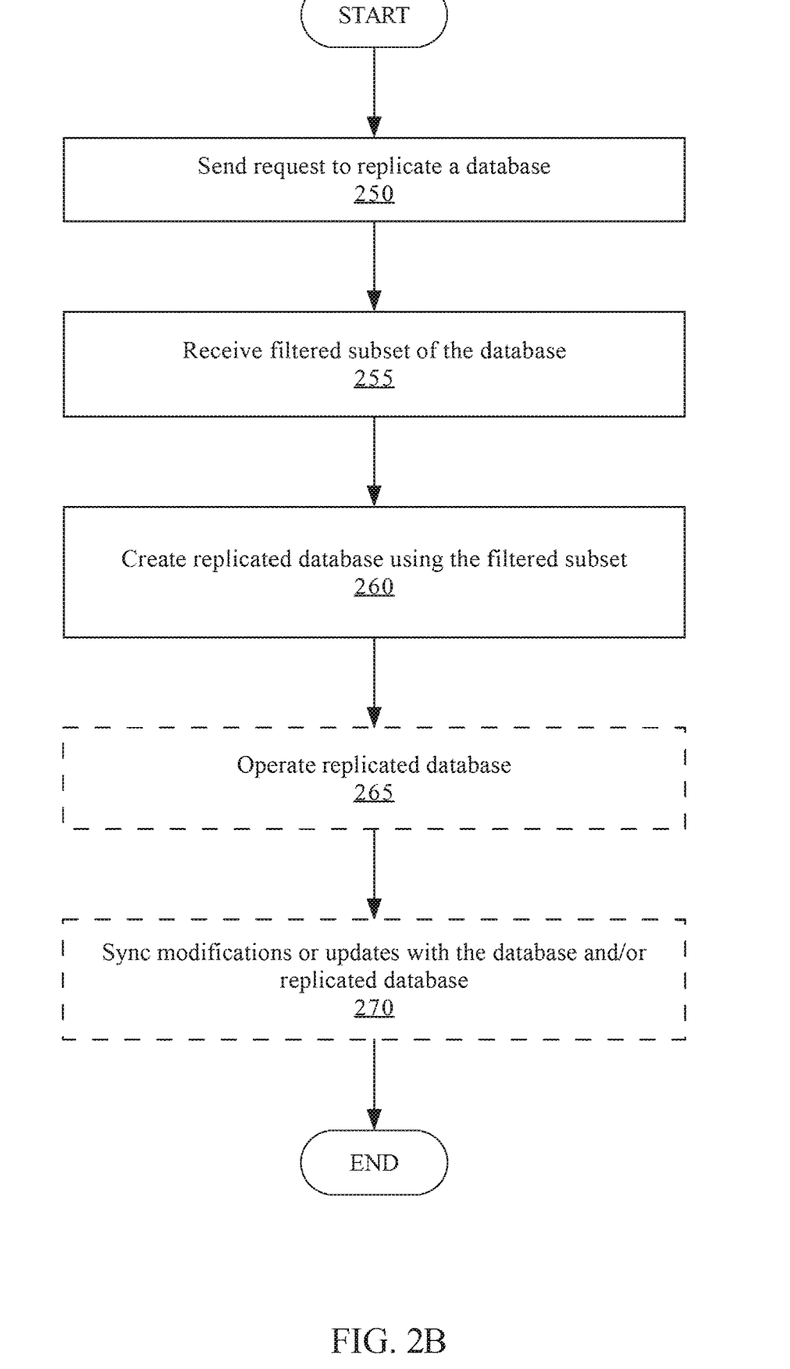

FIG. 2A and FIG. 2B show example flowcharts of a method for secure database replication. Although the steps in FIG. 2A and FIG. 2B are shown in an order, the steps of FIG. 2A and FIG. 2B may be performed in any order, and are not limited to the order shown in FIG. 2A or FIG. 2B. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 200, a request is received to replicate a database to a computing device. The request may be received in any manner, at any time. The request may be received, for example, because the computing device will not have a reliable connection to the database in the future, such as the computing device being taken to a remote location. The request may include identifying information for the computing device, current location information for the computing device, a username or individual associated with the request, or any other suitable information.

In step 205, a classification level of the computing device is determined. The classification may be determined based on a mapping of an identification of the computing device to one or more groups. The groups may be assigned to the computing device at a time when the device is configured, or at any other suitable time. Groups may be of any granularity, and may be based on any factors. For example, a computing device that is intended to be used in Asia may be classified into a location group: Asia, a nationality group of the operator(s) may be assigned, such as Country: England, and a team may be assigned, such as team: programmers. From these groups a classification level may be inferred. The classification level determines what information the computing device should receive for the replicated database. By limiting the amount of information in the replicated database to the information viewable by the intended/expected users of the computing device, the security of information within the database is increased. This is because the replicated database does not contain all of the information that the main database contains. Alternatively, or in addition, group memberships may be used in place of classification levels.

In step 210, the database is filtered based on classification levels to generate a filtered subset. The database may be filtered in any manner. Individual database entries, such as objects, files, etc., may be filtered, and/or specific data within a database entry may be filtered, such as fields within a form, names, etc. The filtered subset may be of any size, may be encrypted, and may be compressed using any method. Optionally, additional information may be included with the filtered subset. For example, a list of usernames, passwords, or other information about the registered users of the database may be included. This would enable users of the replicated database to login as if they were accessing the main database, and would enable the enforcement of consistent security privileges regardless of whether a user is accessing the main database or a replicated database.

In step 215, the filtered subset is sent to the computing device. The filtered subset may be sent to the computing device in any format, and using any method. The filtered subset may be sent as one file or object, or as many files or objects. The computing device is able to use the filtered subset to create a replicated database for use by users of the computing device, or by other computing devices that are communicatively connected to the computing device.

In step 220, modifications or updates are synced with the database and/or the replicated database. Modifications or updates may be synced in any suitable manner. For modifications that were made to the main database, the replicated database may request an update, the database entries in each database may be compared, and the main database may send updated database entries to the replicated database. The updated database entries may be new entries, entries that were deleted/instructions to delete entries, modifications to entries, or any other change. The updated database entries are still filtered before being sent to the replicated database to ensure that the replicated database does not contain database entries above the classification level associated with the computing device. Conflicts (i.e., when a database entry was updated on both the main database and the replicated database) may be resolved in any suitable manner.

Likewise, if modifications were made to the replicated database, the replicated database may send the updated database entries, such as new, deleted, or edited entries, to the main database. The main database may then update the corresponding database entries, and resolve any conflicts, in any suitable manner.

Turning to FIG. 2B, in step 250, a request is sent to replicate a database. The computing device may send the request in any suitable manner. As discussed in step 200, the request may have any suitable additional information.

In step 255, a filtered subset of the database is received. The filtered subset of the database may be received in any manner as discussed with regards to sending the filtered subset, in step 215.

In step 260, a replicated database is created using the filtered subset. The replicated database may be created in any manner. Specifically, the replicated database may be created on the computing device, or on a separate device.

In step 265, the replicated database is operated. The replicated database may be operated as though the replicated database is an "original" database. In other words, users may login to the replicated database using the same username and password, or other credentials that would be used to access the original database. Further, the replicated database may support multiple users simultaneously accessing and modifying data within the replicated database, either through the computing device associated with the replicated database, or via a second computing device that connected to the computing device associated with the replicated database. When a user creates or modifies a database entry on the replicated database, that database entry may automatically be associated with the classification level of the computing device, and/or the classification level of the user, as appropriate.

In step 270, modifications or updates are synced with the database and/or the replicated database. The modifications or updates may be synced as discussed in step 220.

Example Use Case

Figure 3:
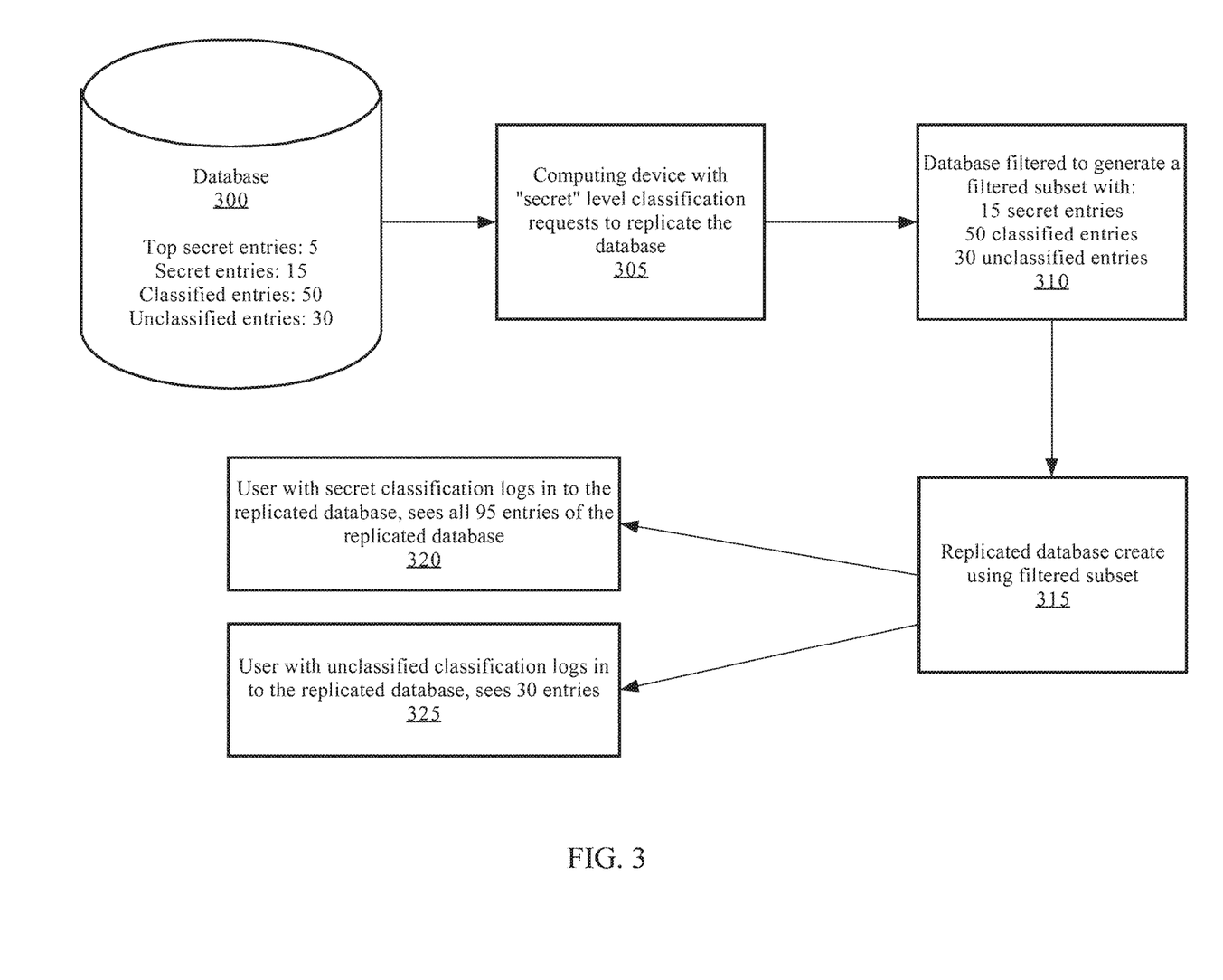
FIG. 3 shows an example in accordance with an embodiment of the invention.

FIG. 3 shows an example use case of secure database replication. The example shown in FIG. 3 has been simplified, to ease understanding and, as such, the example should not be construed to limit the disclosure to the specifics discussed below.

In FIG. 3, a database 300 is shown that contains 100 database entries classified as follows: top secret—5; secret—15; classified—50; unclassified—30. Database 300 is requested to be replicated to a computing device with a secret level classification 305. The secret level classification may be inferred from group memberships assigned when the computing device was initially configured. Specifically, in this example, the computing device is a member of the United States group, is a member of the Middle East region, and is a member of a police unit. These group memberships entitle the computing device to access to secret level database entries and below. Thus, the database is filtered to generate a filtered subset 310, which removes the five top secret database entries. This filtered subset is used to replicate the database 315. Once the replicated database is created, the replicated database is operated using the computing device. Users may login to the replicated database using the same credentials as the users would to login to the original database. Specifically, a user with secret classification logs in to the replicated database, and is able to view all of the database entries within the replicated database 320. This is because both the user and the computing device associated with the replicated database have the same classification level—secret. However, if a user logs in to the replicated database with a lower classification level, such as unclassified, then the user is only able to see the 30 database entries with unclassified classification level 325.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
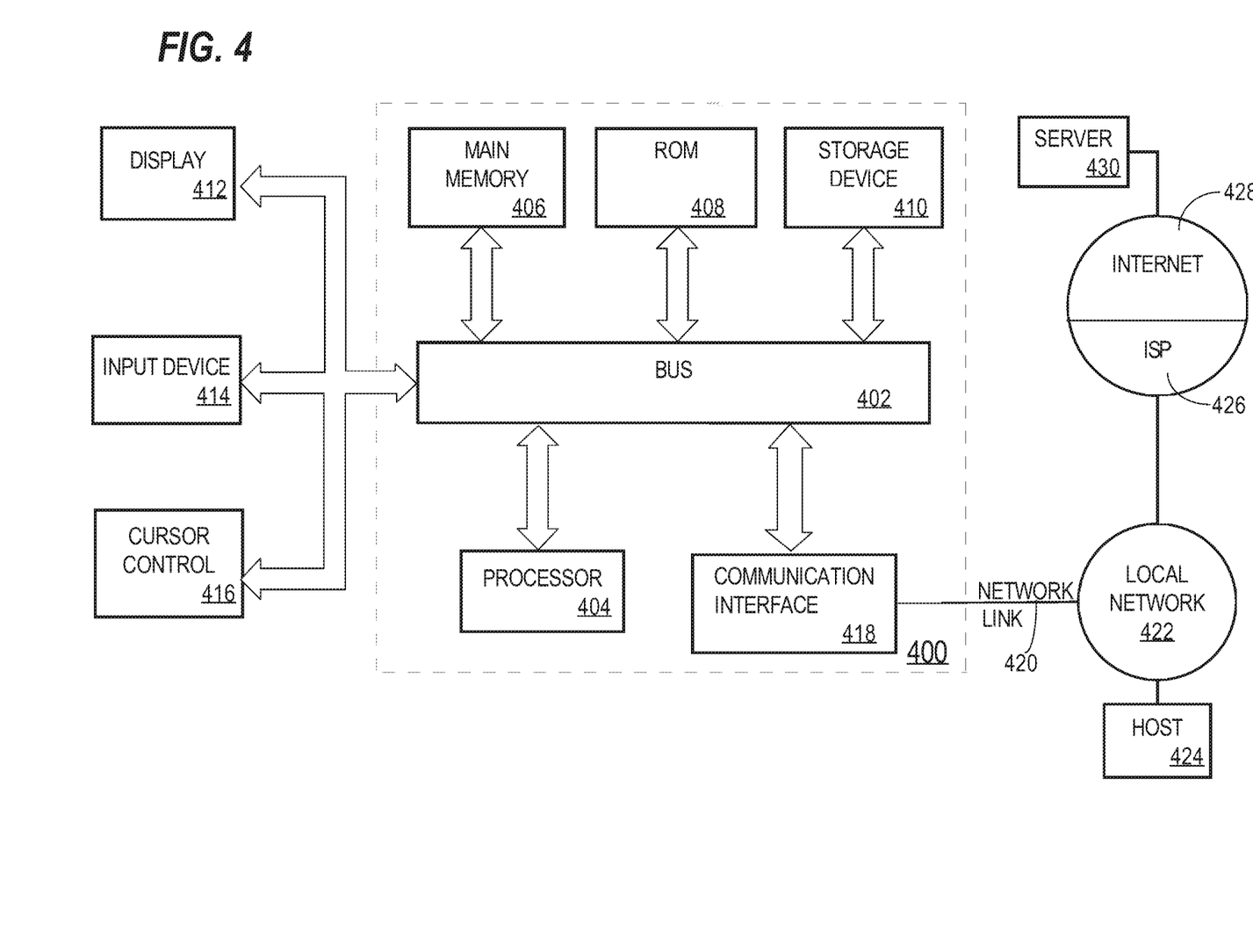
FIG. 4 shows a block diagram of a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, at a server with access to a database comprising a plurality of database entries, a request to replicate the database to a first computing device of a plurality of computing devices, wherein access to each database entry of the plurality of database entries is controlled based on a classification level of a plurality of classification levels, wherein a classification level of a given database entry in the database is automatically assigned as a classification level of a computing device that created the given database entry, and user access to the database entries of the database is further based on a user classification level;
    in response to receiving the request to replicate the database to the first computing device, determining, by the server, a classification level of the first computing device;
    filtering, by the server and using the determined classification level of the first computing device, the plurality of database entries to generate a filtered subset of the plurality of database entries, wherein the filtered subset comprises database entries at or below the classification level of the first computing device; and
    sending, to the first computing device, the filtered subset, wherein the first computing device uses the filtered subset to create a replicated database,
    wherein a second computing device has a second classification level distinct from the classification level of the first computing device and any database entry of the replicated database is editable by both the first and second computing devices.

2. The method of claim 1, wherein the database comprises a plurality of usernames and passwords, wherein the replicated database includes the plurality of usernames and passwords, and wherein the replicated database is available without the first computing device being connected to the server.

3. The method of claim 2, wherein the first computing device is configured to act as second server for the second computing device.

4. The method of claim 1, wherein the classification level of the first computing device is inferred from a group membership associated with the first computing device.

5. The method of claim 1, wherein the classification level of the first computing device is based on a highest classification level among expected users of the first computing device;
    and further comprising filtering, by the server and using the determined classification level of the first computing device based on a highest classification level among expected users of the first computing device, the plurality of database entries of the database to generate the filtered subset of the plurality of database entries.

6. The method of claim 1, further comprising:
    receiving a request from the first computing device to synchronize the replicated database and the database;
    receiving an altered database entry from the replicated database of the first computing device;
    identifying an associated database entry in the database; and
    synchronizing the associated database entry and the altered database entry.

7. The method of claim 1, wherein the database is a single instance servicing a plurality of clients at a plurality of classification levels, and wherein the first computing device is a laptop.

8. One or more non-transitory computer-readable media storing one or more programs, the one or more programs comprising instructions for:
    receiving a request to replicate a database comprising a plurality of database entries to a first computing device of a plurality of computing devices, wherein access to each database entry of the plurality of database entries is controlled based on a classification level of a plurality of classification levels, wherein a classification level of a given database entry is automatically assigned as a classification level of a computing device that created the given database entry, and user access to the database entries of the database is further based on a user classification level;
    in response to receiving the request to replicate the database to the first computing device, determining a classification level of the first computing device;
    determining that the replicated database requested for the first computing device is expected to be used by multiple known users;
    in response to determining that the replicated database requested for the first computing device is expected to be used by multiple known users, filtering, using the determined classification level of the first computing device, the plurality of database entries to generate a filtered subset of the plurality of database entries, wherein the filtered subset comprises database entries at or below the classification level of the first computing device;
    sending, to the first computing device, the filtered subset, wherein the first computing device uses the filtered subset to create a replicated database.

9. The non-transitory computer-readable media of claim 8, wherein the database comprises a plurality of usernames and passwords, wherein the replicated database includes the plurality of usernames and passwords, and wherein the replicated database is available without the first computing device being connected to the server.

10. The non-transitory computer-readable media of claim 9, wherein the first computing device is configured to act as second server for a second computing device to access the replicated database.

11. The non-transitory computer-readable media of claim 8, wherein the classification level of the first computing device is inferred from a group membership associated with the first computing device.

12. The non-transitory computer-readable media of claim 8, wherein the classification level of the first computing device is based on a highest classification level; among expected users of the first computing device;
wherein the one or more programs further comprise instructions for, in response to determining that the replicated database requested for the first computing device is expected to be used by multiple known users, filtering, using the determined classification level of the first computing device based on the highest classification level among expected users of the first computing device, the plurality of database entries to generate the filtered subset of the plurality of database entries.

13. The non-transitory computer-readable media of claim 8, the one or more programs further comprising instructions for:
receiving a request from the first computing device to synchronize the replicated database and the database;
receiving an altered database entry from the replicated database of the first computing device;
identifying an associated database entry in the database; and
synchronizing the associated database entry and the altered database entry.

14. The non-transitory computer-readable media of claim 8, wherein the database is a single instance servicing a plurality of clients at a plurality of classification levels, and wherein the first computing device is a laptop.

15. A system comprising:
memory;
one or more processors;
one or more programs stored in the memory and configured for execution by the one or more processors, the one or more programs comprising instructions for:
receiving a request to replicate a database comprising a plurality of database entries to a first computing device of a plurality of computing devices, wherein access to each database entry of the plurality of database entries is controlled based on a classification level of a plurality of classification levels, wherein a classification level of a given database entry is automatically assigned as a classification level of a computing device that created the given database entry, and user access to the database entries of the database is further based on a user classification level;
in response to receiving the request to replicate the database to the first computing device, determining, using a current location of the first computing device, a classification level of the first computing device;
filtering, using the determined classification level of the first computing device, the plurality of database entries to generate a filtered subset of the plurality of database entries, wherein the filtered subset comprises database entries at or below the classification level of the first computing device;
sending, to the first computing device, the filtered subset, wherein the first computing device uses the filtered subset to create a replicated database.

16. The system of claim 15, wherein the database comprises a plurality of usernames and passwords, wherein the replicated database includes the plurality of usernames and passwords, and wherein the replicated database is available without the first computing device being connected to the server.

17. The system of claim 16, wherein the first computing device is configured to act as second server for a second computing device to access the replicated database.

18. The system of claim 15, wherein the classification level of the first computing device is inferred from a group membership associated with the first computing device.

19. The system of claim 15, the one or more programs further comprising instructions for:
receiving a request from the first computing device to synchronize the replicated database and the database;
receiving an altered database entry from the replicated database of the first computing device;
identifying an associated database entry in the database; and
synchronizing the associated database entry and the altered database entry.

20. The system of claim 15, wherein the database is a single instance servicing a plurality of clients at a plurality of classification levels.

* * * * *